UNITED STATES PATENT OFFICE.

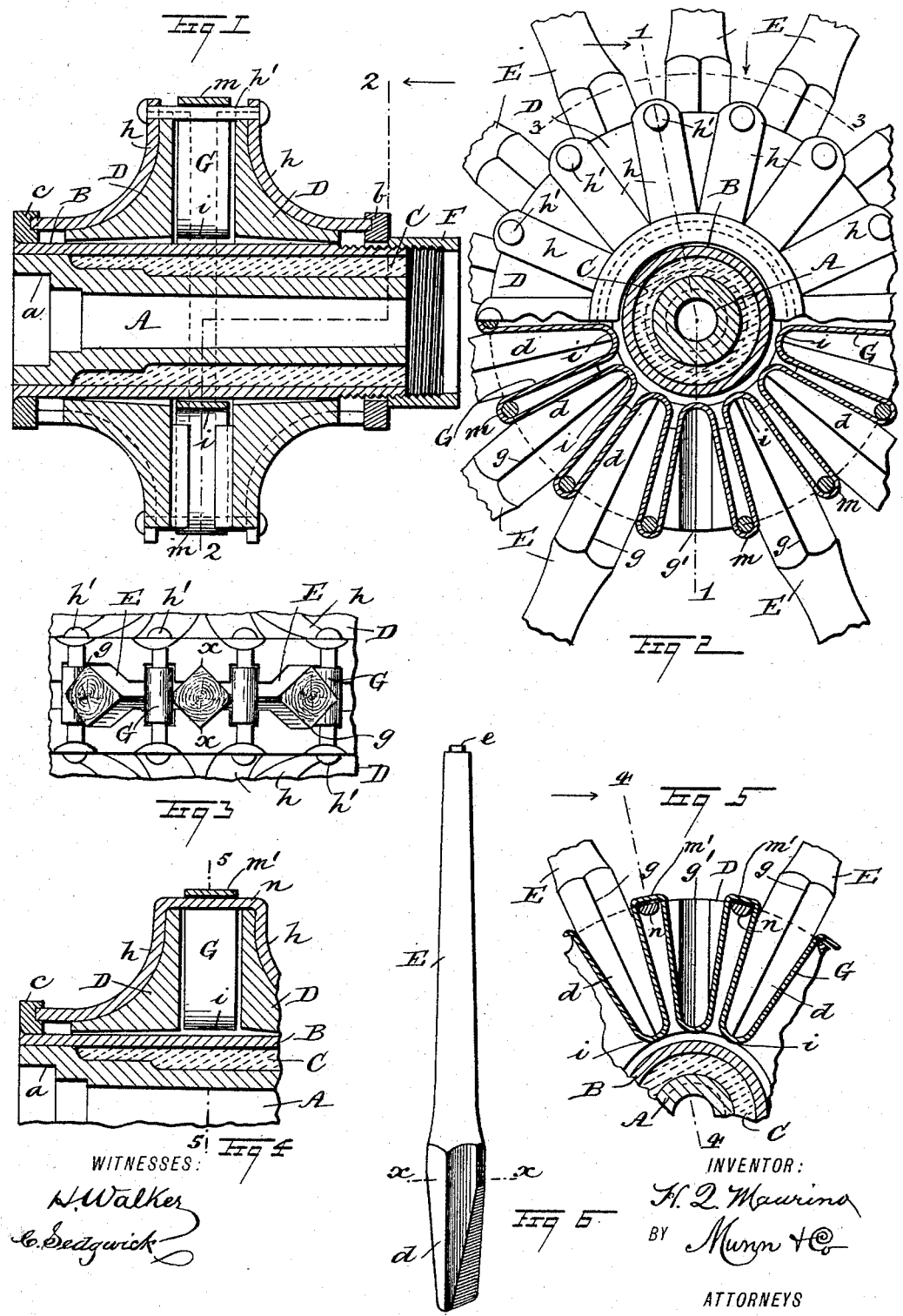

HENRY Q. MAURINO, OF ALBUQUERQUE, TERRITORY OF NEW MEXICO, ASSIGNOR OF ONE-FOURTH TO CHARLES W. KENNEDY, OF SAME PLACE.

VEHICLE-WHEEL.

SPECIFICATION forming part of Letters Patent No. 442,069, dated December 2, 1890.

Application filed October 2, 1890. Serial No. 366,856. (No model.)

*To all whom it may concern:*

Be it known that I, HENRY Q. MAURINO, of Albuquerque, in the county of Bernalillo and Territory of New Mexico, have invented a new and useful Vehicle-Wheel, of which the following is a full, clear, and exact description.

This invention relates to an improvement in vehicle-wheels of a type wherein the hub is mainly metallic, and has for its object to produce a composite wheel-hub and spokes of peculiar conformation, whereby the spokes are securely retained in the hub and adapted to be radially projected so as to tighten the wheel-rim in the tire.

To these ends my invention consists in certain features of construction and combinations of parts, as is hereinafter described, and indicated in the claims.

Reference is to be had to the accompanying drawings, forming a part of this specification, in which similar letters of reference indicate corresponding parts in both the figures.

Figure 1 is a longitudinal section of the wheel-hub on the line 1 1 in Fig. 2. Fig. 2 is a front side elevation of the wheel-hub with broken spokes therein, taken on the line 2 2 in Fig. 1. Fig. 3 is a plan view of the wheel-hub broken and inserted spokes in section, taken on the line 3 3 in Fig. 2. Fig. 4 is a longitudinal section of a hub broken, showing a slightly-modified form of construction taken on the line 4 4 of Fig. 5. Fig. 5 is a transverse broken section of the form of hub shown in Fig. 4, taken on the line 5 5 in said figure, and inserted spokes broken; and Fig. 6 is a detached perspective view of a novel form of spoke used with the improved wheel-hub.

The elongated cylindrical box A of the composite wheel-hub that contains the major features of the invention is of a suitable diameter in its bore to fit an axle-spindle of preferred size (not shown) and is diametrically enlarged at $a$ near the inner end of the hub, to accommodate the collar which usually defines the inner extremity of the spindle. Upon the exterior surface of the enlargement $a$ on the box A a concentric sleeve B is secured by one of its ends, thereby producing an annular channel between the sleeve and box, which is filled by the packing-shell C, that is formed of wood or other suitable material.

The free end of the sleeve B, which represents the outer end of the wheel-hub, is threaded, and on it is placed loosely a ring $b$, that has an annular groove formed on its inner face, as shown in Fig. 1. On the other end of the sleeve B, which is secured upon the box A, a collar $c$ is affixed, which collar is grooved on its inner face in a manner similar to the groove in the ring $b$.

The two metallic hub-sections D are alike in form, and consist of centrally-apertured disks, which are adapted to fit loosely upon the sleeve B, the bore of each hub-section being slightly enlarged in conical form from the outer toward the inner face of said sections, as represented in Fig. 1. The adjacent faces of the hub-sections D are parallel and at right angles to the body of the sleeve B when mounted on it, and, as will be seen in Fig. 1, the outer upper corner of the hub-section is removed and the peripheral surface incurved, so as to afford a neat appearance and proper conformation.

A sufficient space is allowed between the hub-sections D to adapt them to laterally clamp the inserted ends of the spokes E, which latter will be further described, and to facilitate the introduction and proper support of the series of spokes radial V-shaped grooves are formed in the inner faces of the hub-sections at evenly-spaced intervals.

As represented in Fig. 6, the spokes E, which are of like form, have their bodies rounded and tapered from the tenon ends $d$, that enter the hub, to dowel ends $e$, which engage a wheel rim or felly. The tenon $d$ on each spoke E is substantially square in cross-section on the line $x\,x$ in Figs. 3 and 6. Its opposite angular corners $g$ being parallel throughout the length of the tenon, are of proper dimensions to fit closely within the radial angular grooves $g'$, provided and oppositely located in the hub-sections D.

Between the spokes E evenly-divided channels are formed in the hub-sections D on their exterior incurved faces, said grooves or channels being rounded in cross-section to adapt them to form seats for the embedment of the similarly-formed bars $h$, which are joined in pairs at their upper ends by the transverse bolts $h'$, each pair of bars and its connecting-bolt constituting a saddle-frame. The lower ends of the embedded curved bars $h$ are located in the annular grooves formed in the collar $c$ and ring $b$, and upon the outer face of the latter-named piece the sand-band F is made to bear, said band having an interior thread that engages the projecting threaded end of the sleeve B. The spoke-tenons $d$ are tapered into wedge form on the corners, which are at right angles to the corners $g$ and are also rounded on the lower ends of the tenons, as represented in Figs. 2 and 5.

A radially-undulated endless band G is provided that is properly proportioned to the size of parts it engages, which band is adapted to lie between the hub-sections D and embrace the wedge-shaped bodies of the spoke-tenons $d$, that are seated on the inner return bent portions $i$ of the undulating band, the outer bends $m$ therein being supported on the transverse bolts $h'$, that connect the curved bars $h$ in pairs, as before stated.

If the spokes E are inserted in an ordinary felly that is banded in the usual way by a tire, (not shown,) it is evident that the revoluble movement of the band F to screw it upon the sleeve B will compress the engaged lower ends of the bars $h$ toward each other in pairs and cause the saddle-frames they form portions of to slide outwardly, which radial movement of the series of saddle-frames will correspondingly expand the band G, shorten its undulations, and force the spokes E outwardly in an equal degree, so as to tighten the tire and preserve the concentricity of an engaged felly in an obvious manner.

In Figs. 4 and 5 a modified form for the saddle-frames which support the undulating band G is shown, which consists in integrally uniting the curved bars $h$ at their upper extremities, the joining-web $n$ being produced from the same material of which the bars $h$ are composed, said webs being preferably seated in transverse grooves formed in the peripheral edges of the hub-sections D in alignment with the channels wherein the curved side bars $h$ are embedded and engaging the outer undulations of the band, as at $m'$ in Fig. 5.

By the provision of the shell C, which should be made of slightly-elastic material, the percussion sustained when the wheel is in use is absorbed, the peculiar formation of the hub-sections D contributing to such a result, while they retain the spokes E from rattle or lateral divergence.

Having thus described my invention, I claim as new and desire to secure by Letters Patent—

1. A vehicle-wheel having its hub provided with an undulating endless band whereon the spokes of the wheel are seated and adapted to be radially projected, substantially as set forth.

2. A vehicle-hub having its hub-box engaged by a concentric sleeve whereon two loose circular hub-sections are mounted, and further provided with a radially-undulating endless band located between the hub-sections and supported on spaced radial saddle-frames, substantially as set forth.

3. The combination, with a hub-box, a concentric sleeve secured by one end to the box, and a collar affixed on this end of the sleeve, of two circular hub-sections, a radially-undulating endless band, a series of spaced saddle-frames which engage the band, and means to compress the saddle-frames laterally and distend the endless band, substantially as set forth.

4. The combination, with a hub-box, a concentric sleeve secured by one end to the box and having its free end threaded, and a collar fixed to the fast end of the sleeve, of two circular hub-sections, a radially-undulating endless band, a series of spaced saddle-frames which engage the band, a ring on the free end of the sleeve, and an interiorly-threaded sand-band engaging the sleeve, substantially as set forth.

5. The combination, with a hub-box, a concentric sleeve secured by one end to the box, and a collar affixed on this end of the sleeve, of two circular hub-sections between which a series of spokes are retained in spaced adjustment, a radially-undulating endless band, the series of spokes being seated in undulations of the band, a series of spaced saddle-frames which alternate with the spokes and engage the band between said spokes, and means to compress the saddle-frames laterally and distend the endless band, substantially as set forth.

6. The combination, with an elongated hub-box which is cylindrically enlarged at one end; a concentric sleeve thereon which is attached to the enlarged portion of the box and is exteriorly threaded at its other end, and an intervening lining-shell of slightly-elastic material, of two similar circular hub-sections which are grooved alike on their parallel adjacent radial faces for spoke-tenons, a radially-undulated endless band, a series of spokes located within undulations of this band, a series of saddle-frames which alternate with the spokes and engage the undulating band, a fixed collar that abuts on the saddle-frame ends on one side of the spokes, a ring on the sleeve which impinges on the other ends of the saddle-frames, and an interiorly-threaded sand-band adjacent to the ring on the sleeve end and engaging the sleeve, substantially as set forth.

HENRY Q. MAURINO.

Witnesses:
FANAZIE SELVA,
E. S. McPHERSON.